United States Patent
Hama

(10) Patent No.: US 9,239,945 B2
(45) Date of Patent: Jan. 19, 2016

(54) BIOMETRIC AUTHENTICATION APPARATUS AND BIOMETRIC AUTHENTICATION METHOD

(71) Applicant: FUJITSU LIMITED, Kawasaki-shi, Kanagawa (JP)

(72) Inventor: Soichi Hama, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 14/042,772

(22) Filed: Oct. 1, 2013

(65) Prior Publication Data
US 2014/0133710 A1   May 15, 2014

(30) Foreign Application Priority Data

Nov. 13, 2012   (JP) .................................. 2012-249203

(51) Int. Cl.
| G06K 9/00 | (2006.01) |
| G05B 19/00 | (2006.01) |
| G06F 21/00 | (2013.01) |
| G06F 21/32 | (2013.01) |

(52) U.S. Cl.
CPC ............ *G06K 9/00087* (2013.01); *G06F 21/32* (2013.01)

(58) Field of Classification Search
CPC ................ G06K 9/00; G06K 9/00382; G06K 2009/00395; G06K 9/00885; G06K 2009/00932; G06K 9/00013; G06K 9/00087; G06K 9/00375; G06F 21/32; A61B 5/117
USPC ......... 382/100, 115, 118, 124, 116, 276, 278, 382/181, 224; 713/186, 182, 185, 183, 168, 713/150; 726/2, 3, 5, 16, 17, 19; 340/1.1, 340/5.1, 5.2, 5.51, 5.52, 5.8, 5.81, 5.82, 340/5.83; 235/375, 380, 382, 382.5, 435, 235/439, 454

See application file for complete search history.

(56) References Cited

U.S. PATENT DOCUMENTS

| 7,054,470 B2 * | 5/2006 | Bolle et al. ..................... 382/124 |
| 7,359,534 B2 * | 4/2008 | Semba et al. .................. 382/124 |
| 7,565,548 B2 * | 7/2009 | Fiske et al. ..................... 713/186 |
| 8,565,494 B2 * | 10/2013 | Fukuda et al. ................. 382/115 |

(Continued)

FOREIGN PATENT DOCUMENTS

| JP | 2001-229380 | 8/2001 |
| JP | 2006-085268 | 3/2006 |

(Continued)

*Primary Examiner* — Sheela C Chawan
(74) *Attorney, Agent, or Firm* — Fujitsu Patent Center

(57) ABSTRACT

A biometric authentication apparatus includes: a storage unit which stores representative matching data representing features of biometric information of a registered user and representing conditions of a designated body part of the registered user, each representing one of at least two different portions of a variation range over which the condition of the body part containing the registered user's biometric information varies due to cyclic environmental variations; a biometric information acquiring unit which generates a biometric image representing biometric information of a user; a matching data generating unit which generates, from the biometric image, input matching data that represents the features of the biometric information of the user; a matching unit which matches the input matching data against at least one of the representative matching data; and an authentication judging unit which judges, based on a result of the matching, whether the user is to be authenticated or not.

13 Claims, 8 Drawing Sheets

(56) References Cited

U.S. PATENT DOCUMENTS

| | | |
|---|---|---|
| 8,644,566 B2 * | 2/2014 | Abe .............................. 382/124 |
| 8,816,818 B2 * | 8/2014 | Yamada et al. .............. 340/5.82 |
| 8,948,464 B2 * | 2/2015 | Hama et al. .................. 382/115 |
| 2008/0212846 A1 | 9/2008 | Yamamoto et al. |
| 2010/0060417 A1 | 3/2010 | Niinuma |
| 2010/0142764 A1 | 6/2010 | Ikegami |

FOREIGN PATENT DOCUMENTS

| | | |
|---|---|---|
| JP | 2007-226519 | 9/2007 |
| JP | 2008-171094 | 7/2008 |
| JP | 2010-061528 | 3/2010 |
| JP | 2010-079448 | 4/2010 |
| WO | 2009/025054 | 2/2009 |

* cited by examiner

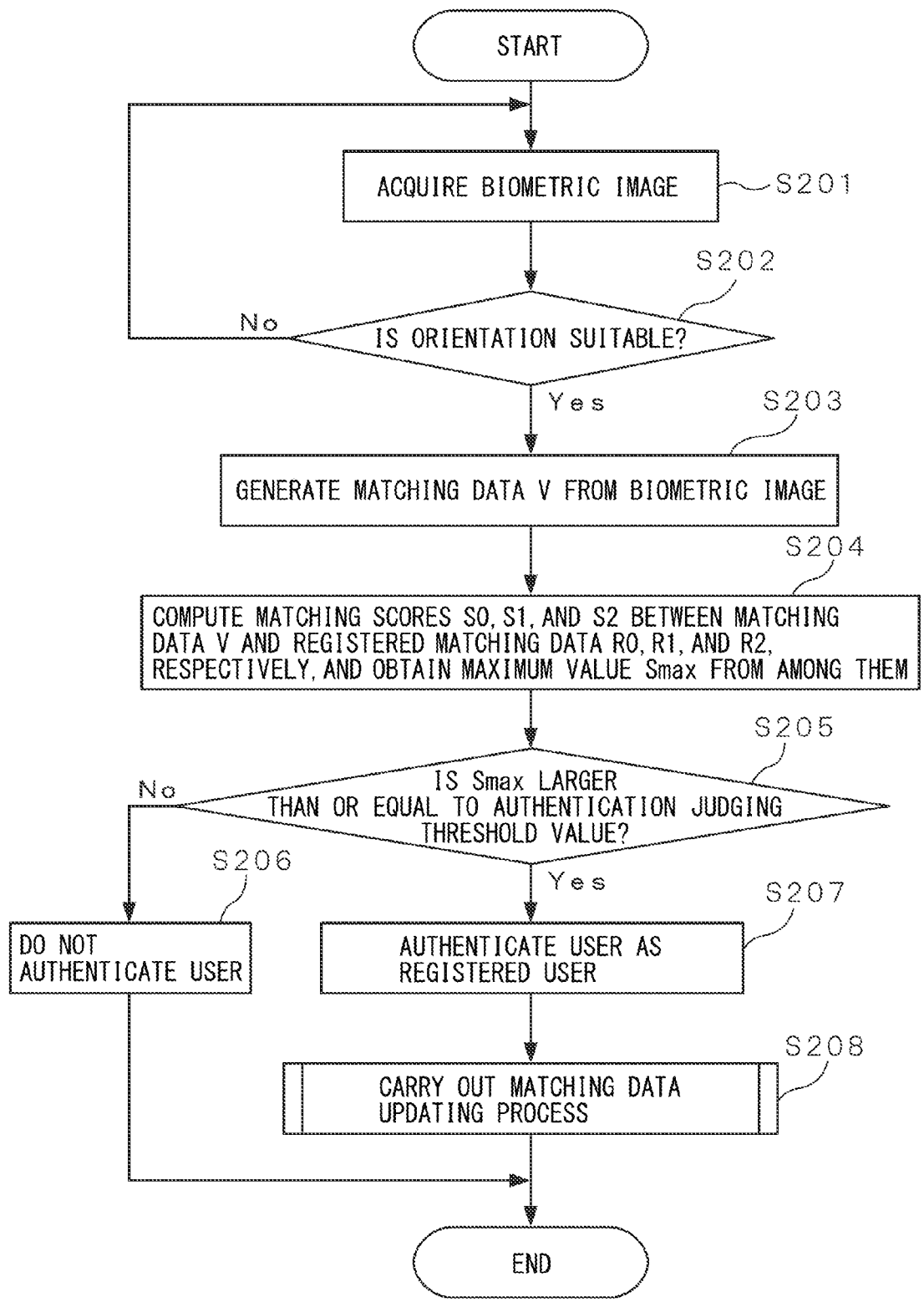

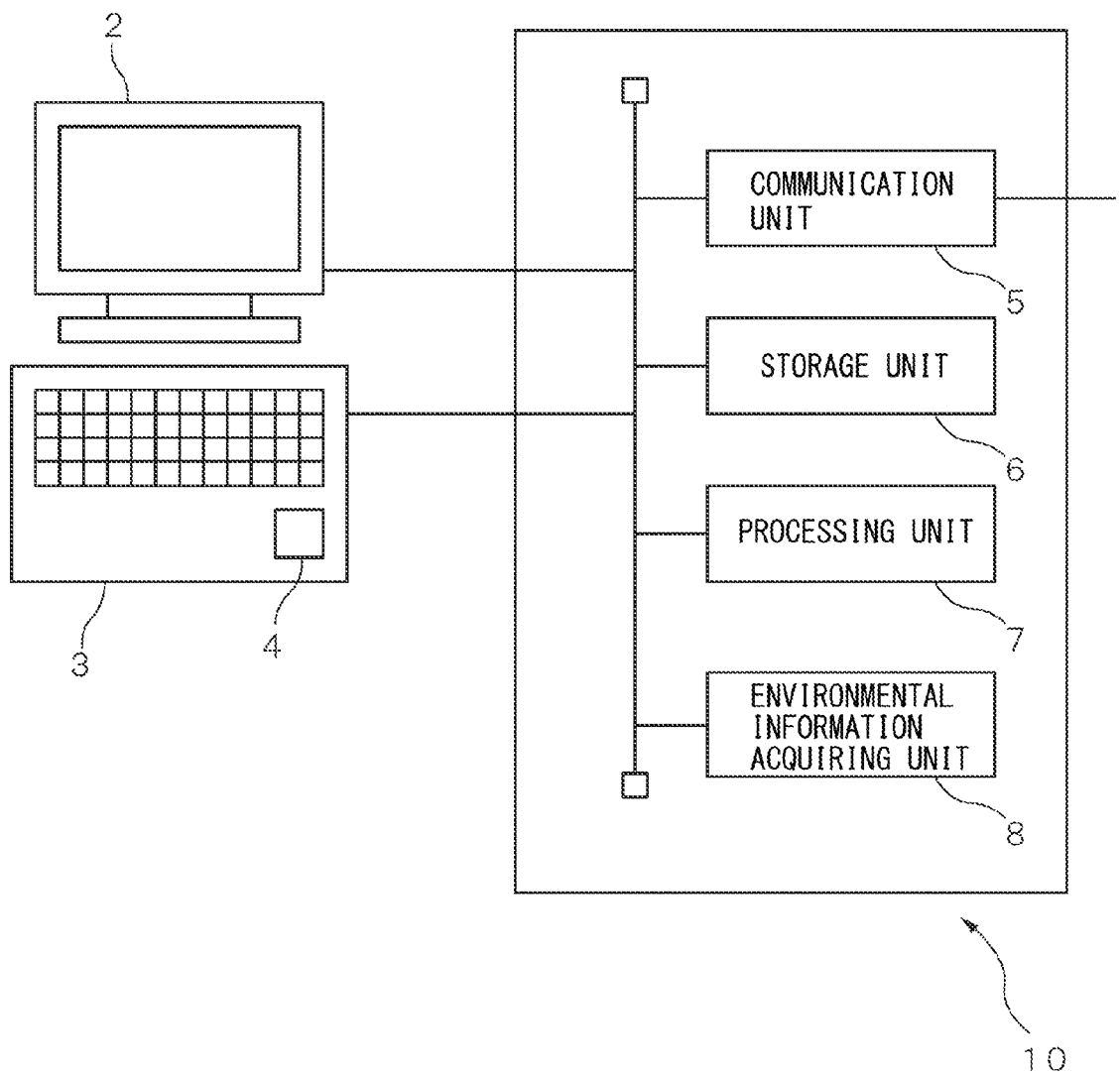

BIOMETRIC AUTHENTICATION APPARATUS AND BIOMETRIC AUTHENTICATION METHOD

CROSS-REFERENCE TO RELATED APPLICATION

This application is based upon and claims the benefit of priority of the prior Japanese Patent Application No. 2012-249203, filed on Nov. 13, 2012, the entire contents of which are incorporated herein by reference.

FIELD

The embodiments discussed herein are related to a biometric authentication apparatus and a biometric authentication method.

BACKGROUND

Recent years have seen the development of biometric authentication technology for authenticating a user of an apparatus or system based on a biometric image representing the user's biometric information such as a palm or finger vein pattern or a fingerprint or palm print. A biometric authentication apparatus using such biometric authentication technology acquires, for example, as an input biometric image, a biometric image representing the biometric information of the user who is going to use the biometric authentication apparatus. Then, the biometric authentication apparatus compares input biometric information, i.e., the user's biometric information represented on the input biometric image, with preregistered biometric information, i.e., the biometric information prestored in the form of a biometric image for each preregistered user. If the result of the comparison indicates that the input biometric information matches the preregistered biometric information, the biometric authentication apparatus authenticates the user as being a legitimate registered user. The biometric authentication apparatus then permits the authenticated user to use the apparatus in which the biometric authentication apparatus is incorporated or some other apparatus connected to the biometric authentication apparatus.

The biometric information represented on such a biometric image changes depending on the condition at the time of acquisition of the biometric image. For example, when a palm vein pattern is used for authentication, the condition at the time of biometric image acquisition that affects the biometric information includes the orientation of the hand such as the position or tilting of the hand relative to the vein sensor. On the other hand, when a fingerprint is used for authentication, the condition at the time of biometric image acquisition that affects the biometric information includes the orientation of the finger relative to an area-type fingerprint sensor or the moving speed of the finger relative to a slide-type fingerprint sensor. If the change in the biometric information is large enough that the difference between the input biometric information represented on the input biometric image and the preregistered biometric information represented on the biometric image acquired at the time of registration becomes significant, the authentication accuracy may degrade. In view of this, the biometric authentication apparatus, for example, determines whether the condition at the time of acquisition of the biometric image is appropriate or not, and if it is determined that the condition is not appropriate, an image of the biometric pattern is recaptured to reacquire the biometric image, and the reacquired biometric image is used for authentication, thereby preventing the degradation of the authentication accuracy.

The biometric information represented on the biometric image may also change when the condition of the body part containing the biometric information is affected, for example, by an environmental factor such as weather. When a palm vein pattern is used for authentication, the condition of the body part is, for example, the degree of contraction of the blood vessels due to temperature. On the other hand, when a fingerprint is used for authentication, the condition of the body part is, for example, the skin condition which depends on the degree of dryness of the skin surface due to humidity. For most users, the condition of the body part containing the biometric information is relatively unaffected by temperature or humidity variations associated with seasonal variations; therefore, for such users, the authentication accuracy is stable throughout the year.

On the other hand, for some users, the condition of the body part containing the biometric information may be significantly affected by temperature or humidity variations associated with seasonal variations. For such users, if the biometric information is registered, for example, in summer, the input biometric information represented on the input biometric image acquired in winter for authentication may be significantly different from the registered biometric information, and the biometric authentication apparatus may fail to authenticate the user.

In the prior art, methods are proposed for updating the registered biometric information as needed (for example, refer to Japanese Laid-open Patent Publication Nos. 2007-226519, 2010-61528, 2006-85268, 2010-79448, and 2008-171094). For example, in Japanese Laid-open Patent Publication No. 2007-226519, there is proposed a biometric information updating management system in which, if the last update date of the master biometric information stored in a storage device is past its validity date, the biometric information presented for authentication and judged to match the master biometric information is registered as the master biometric information. On the other hand, in Japanese Laid-open Patent Publication No. 2010-61528, there is disclosed a biometric authentication apparatus in which feature information having high reproducibility is extracted from the registered data and the data presented for authentication, and new registration data is created from the extracted feature information and is used to update the registered data.

Further, in Japanese Laid-open Patent Publication No. 2006-85268, there is proposed a biometric authentication system in which when the performance of authentication using the registered data stored in an IC card registration data storage unit has degraded, the registered data stored in the registration data storage unit is updated by registered data stored in a registration database. Furthermore, in Japanese Laid-open Patent Publication No. 2010-79448, there is proposed a finger vein authentication system which determines whether the preregistered finger vein pattern data is appropriate or not, and urges the user to perform a re-registration operation depending on the result of the determination. On the other hand, in Japanese Laid-open Patent Publication No. 2008-171094, there is disclosed a biometric authentication apparatus which determines whether the biometric information presented for authentication is to be accepted or not, based on the matching score between the presented biometric information and each one of a plurality of biometric information templates, in order to replace a selected one of the biometric information templates with the accepted biometric information.

However, in any of these prior art methods, the registered biometric information is updated independently of cyclic environmental variations such as seasonal variations. Therefore, there can occur cases where the registered biometric information representing the condition of the body part containing the biometric information acquired in a given season, for example, is updated by the biometric information acquired in a different season. As a result, if authentication is performed after a certain length of period has elapsed from the last update of the registered biometric information, since the season at the time of the authentication is different from the season at the time of the registration, it follows that the biometric authentication apparatus performs the authentication by using the registered biometric information representing the condition that is different from the condition of the body part at the time of the authentication. This can result in a degradation of authentication accuracy.

On the other hand, there is proposed a fingerprint matching system in which date/time information such as the time of day, day of week, and date of year of registration is registered along with each fingerprint image and, at the time of fingerprint matching, fingerprint images registered within a specified date/time range are read out and used for matching (for example, refer to Japanese Laid-open Patent Publication No. 2001-229380).

SUMMARY

However, with the technique disclosed in Japanese Laid-open Patent Publication No. 2001-229380, the problem has been that the registered biometric information may have been affected by a factor other than cyclic environmental variations at the time of the registration, for example, an incidental factor such as the skin surface being wet due to washing work. There has therefore been the possibility that the registered biometric information selected at the time of matching may represent the condition of the body part different from the condition of the body part containing the biometric information acquired in the environment at the time of matching.

According to one embodiment, a biometric authentication apparatus is provided. The biometric authentication apparatus includes: a storage unit which stores representative matching data that represent features of biometric information of a registered user and that represent conditions of a designated body part of the registered user, each representing one of at least two different portions of a variation range over which the condition of the body part containing the registered user's biometric information varies due to cyclic environmental variations; a biometric information acquiring unit which generates a biometric image that represents biometric information of a user; a matching data generating unit which generates, from the biometric image, input matching data that represents the features of the biometric information of the user; a matching unit which matches the input matching data against at least one of the representative matching data; and an authentication judging unit which judges, based on a result of the matching, whether the user is to be authenticated as being the registered user or not.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is an operation flowchart illustrating a biometric authentication process.

FIG. 8 is a diagram schematically illustrating the configuration of a biometric authentication apparatus according to a second embodiment.

DESCRIPTION OF EMBODIMENTS

Biometric authentication apparatus according to various embodiments will be described below with reference to the drawings.

The biometric authentication apparatus registers in advance representative matching data that represent the features of biometric information of each registered user and that represent the conditions of a designated body part of the registered user, each representing one of at least two different portions of the variation range over which the condition of the body part containing the registered user's biometric information varies due to cyclic environmental variations. Then, the biometric authentication apparatus computes input matching data from the input biometric image acquired at the time of matching as representing the user's biometric information, and compares the input matching data with each representative matching data to determine whether the user is to be authenticated as being the registered user or not. Each time the matching process is performed for the registered user, the biometric authentication apparatus obtains the matching score indicating the degree of similarity between the input matching data and the matching data generated from the biometric image carrying the registered user's biometric information acquired at a designated time. Then, by referring to the temporal variation of the matching score, the biometric authentication apparatus determines the representative matching data.

The cyclic environmental variations refer to the variations of environmental parameters, such as temperature, humidity, etc., that affect the body part containing the biometric information over a relatively long period ranging from several weeks to one or so years, exemplified by seasonal variations.

In the present embodiment, the biometric authentication apparatus uses a palm vein pattern as the biometric information for biometric authentication. However, other kinds of biometric information, such as fingerprint or palm print, that may potentially be affected by cyclic environmental variations, and that can be presented in the form of a still image, may be used as the biometric information for biometric authentication.

In this specification, the term "matching process" is used to refer to the process for computing a matching score that indicates the degree of similarity between input biometric information and registered biometric information. Further, the term "biometric authentication process" is used to refer to the entire authentication process which includes not only the matching process but also the process for determining whether the user is an authenticated user or not by using the result of the matching process.

Figure 1:
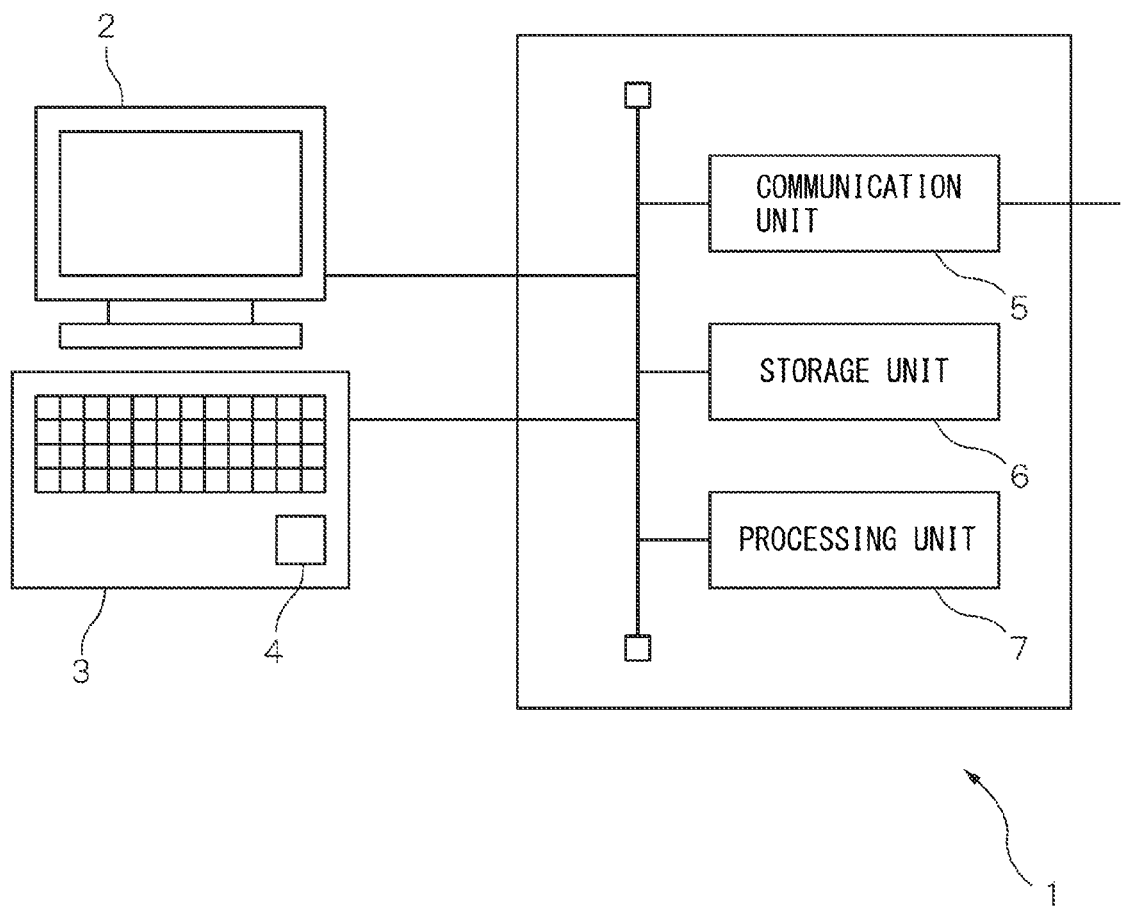
FIG. 1 is a diagram schematically illustrating the configuration of a biometric authentication apparatus according to a first embodiment.

FIG. 1 is a diagram schematically illustrating the configuration of a biometric authentication apparatus according to a first embodiment. As illustrated in FIG. 1, the biometric authentication apparatus 1 includes a display unit 2, an input unit 3, a biometric information acquiring unit 4, a communication unit 5, a storage unit 6, and a processing unit 7. The display unit 2, input device 3, and biometric information acquiring unit 4 may be provided separately from the cabinet containing the communication unit 5, storage unit 6, and processing unit 7. Alternatively, the display unit 2, input device 3, biometric information acquiring unit 4, communication unit 5, storage unit 6, and processing unit 7 may all be contained in a single cabinet, as in a so-called notebook computer or a tablet-type terminal. The biometric authentication apparatus 1 may further include a storage media access device (not depicted) for accessing a storage medium such as a magnetic disk, a semiconductor memory card, or an optical storage medium. Then, the biometric authentication apparatus 1 may read out, via the storage media access device, a biometric authentication computer program stored on the storage medium and to be executed on the processing unit 7, and may carry out the biometric authentication process in accordance with the computer program.

The biometric authentication apparatus 1 generates by means of the biometric information acquiring unit 4 a biometric image representing the user's palm vein pattern, and carries out the biometric authentication process by using the biometric image. When the user is authenticated as being one of the registered users as a result of the biometric authentication, the biometric authentication apparatus 1 permits the user to use a host apparatus in which the biometric authentication apparatus 1 is incorporated. Alternatively, the biometric authentication apparatus 1 transmits to another apparatus (not depicted), via the communication unit 5, a signal indicating that the user has been authenticated, and permits the user to use that other apparatus.

The display unit 2 includes a display device such as a liquid crystal display. The display unit 2 displays a message indicating the body part (right hand or left hand) to be used for authentication or a guidance message for directing the user to place his hand properly on the position where the biometric information acquiring unit 4 can correctly acquire the biometric image. The display unit 2 also displays various kinds of information associated with applications executed by the processing unit 7.

The input unit 3 includes, for example, a keyboard and a pointing device such as a mouse. A command, data, user name, or user identification number entered via the input unit 3 by the user is passed to the processing unit 7.

The biometric information acquiring unit 4 generates the biometric image representing the user's palm vein pattern. For this purpose, the biometric information acquiring unit 4 includes, for example, a two-dimensional array of imaging devices and an optical system. The optical system focuses an image of the body part placed within a prescribed distance of the surface of the biometric information acquiring unit 4 onto the imaging device array so that the vein pattern can be captured in the biometric image without the user having to bring his hand into contact with the biometric information acquiring unit 4. The biometric information acquiring unit 4 may further include an illuminating light source such as an infrared light-emitting diode for illuminating the user's hand. In the biometric image captured, the brightness of the pixels representing the user's hand becomes higher than the brightness of the other pixels in the image. Each time the biometric image is generated, the biometric information acquiring unit 4 transmits the biometric image to the processing unit 7.

The communication unit 5 includes a communication interface circuit for connecting the biometric authentication apparatus 1 to a communication network (not depicted). The communication unit 5 transmits the use permit granted to the user, or the result of the authentication received from the processing unit 7, to another apparatus via the communication network. Further, the communication unit 5 may acquire information concerning the environment, such as temperature or humidity, via the communication network, and may pass the information to the processing unit 7.

The storage unit 6 includes, for example, a nonvolatile semiconductor memory and a volatile semiconductor memory. The storage unit 6 stores an application program to be used in the biometric authentication apparatus 1, the user name, user identification number, and personal setting information of at least one registered user, and various kinds of data. The storage unit 6 also stores a program for carrying out the biometric authentication process. Further, for each registered user, the storage unit 6 stores representative matching data representing the features of the palm vein pattern of the left or right hand as the registered biometric information of the registered user. The representative matching data includes, for example, the positions or kinds of the feature points representing the characteristic features, such as the endings or bifurcations of the veins, extracted from the biometric image generated at the time of registration of the registered user or at the time of updating of the representative matching data.

Alternatively, the representative matching data may be the biometric image itself generated at the time of registration of the registered user or at the time of updating of the representative matching data, or a portion of the biometric image.

In the present embodiment, at least two representative matching data are stored for each registered user. The representative matching data are the matching data that correspond to the conditions representing different portions of the variation range over which the condition of the body part containing the biometric information varies due to cyclic environmental variations. In the present embodiment, two representative matching data are stored, and each data represents the biometric information of the registered user at one of two end points of the variation range that represents one of two portions into which the variation range of the condition of the body part containing the biometric information of the registered user has been divided. As will be described later, at least one representative matching data continues to be updated until the two representative matching data are each updated to represent the biometric information of the registered user at the corresponding one of the two end points of the variation range of the condition of the body part containing the biometric information of the registered user. When the two representative matching data have been updated to represent the biometric information at the respective end points of the variation range of the condition of the body part, the updating of the representative matching data is stopped. Then, the representative matching data after stopping the updating are held in the storage unit 6. The updating of the representative matching data is performed for each registered user.

The processing unit 7 includes one or a plurality of processors and their peripheral circuitry. The processing unit 7 acquires the biometric image representing the user's biometric information from the biometric information acquiring unit 4, and carries out the biometric authentication process by using the acquired biometric image. Further, the processing unit 7 carries out a registration process for registering the user as a registered user.

Figure 2:
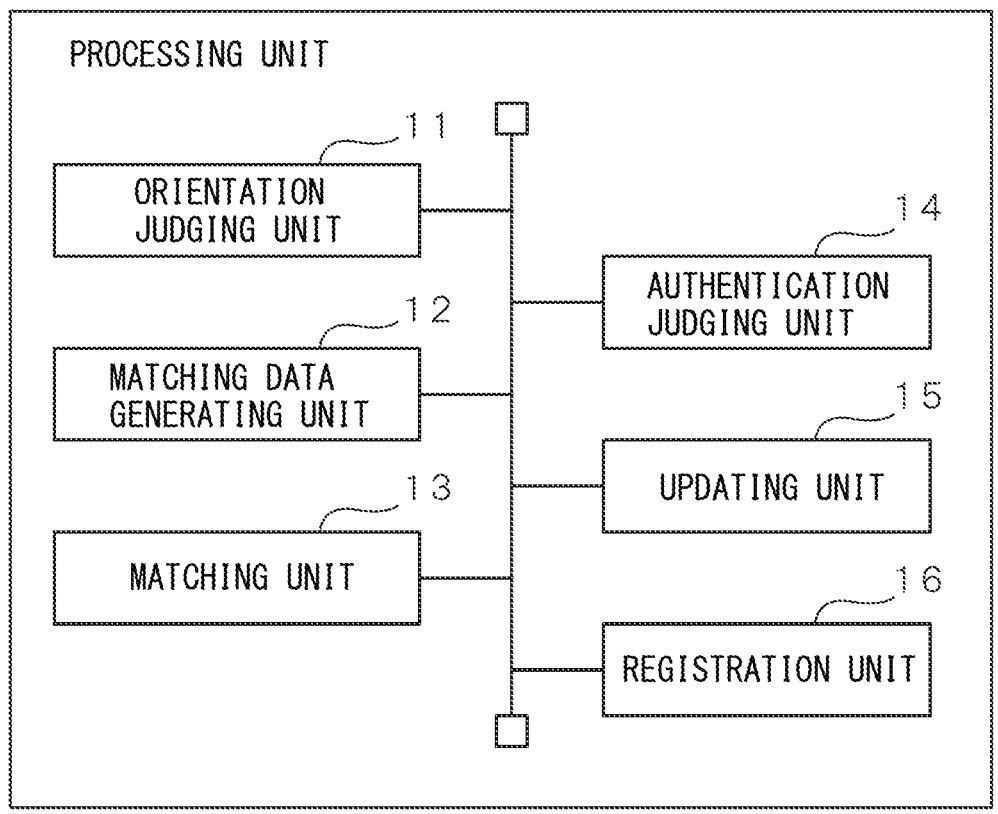
FIG. 2 is a functional block diagram of a processing unit contained in the biometric authentication apparatus.

FIG. 2 is a functional block diagram of the processing unit 7. As illustrated in FIG. 2, the processing unit 7 includes an orientation judging unit 11, a matching data generating unit 12, a matching unit 13, an authentication judging unit 14, an updating unit 15, and a registration unit 16. These units constituting the processing unit 7 are functional modules implemented by executing a computer program on the processor contained in the processing unit 7. Alternatively, these units constituting the processing unit 7 may be implemented as firmware on the biometric authentication apparatus 1.

Of these units constituting the processing unit 7, the orientation judging unit 11 and the matching data generating unit 12 are used in both the registration process and the biometric authentication process. The registration unit 16 is used in the registration process. On the other hand, the matching unit 13 and the authentication judging unit 14 are used in the biometric authentication process. The updating unit 15 is used in the biometric authentication process until the two representative matching data of the registered user stored in the storage unit 6 have come to represent the biometric information at the respective ends of the variation range over which the condition of the body part containing the biometric information of the registered user varies due to cyclic environmental variations. When the two representative matching data of the registered user have been updated to represent the biometric information at the respective ends of the variation range, the updating unit 15 no longer need be used.

(Registration Process)

First, the registration process will be described.

Based on the biometric image generated by the biometric information acquiring unit 4, the orientation judging unit 11 judges whether the body part (in the present embodiment, the hand) containing the user's biometric information carried in the biometric image is oriented properly to be processed in the matching process.

For example, the orientation judging unit 11 detects, from the biometric image, a subject region which is the region on the biometric image that contains the body part (in the present embodiment, the hand) as the biometric information. In the present embodiment, the value of any pixel contained in the background region which is made up of pixels forming the non-image region is lower than the value of any pixel contained in the subject region. Therefore, the orientation judging unit 11 detects a set of pixels whose pixel values are not lower than a predetermined threshold value, and determines the set of such pixels as being a set of subject candidate pixels that may potentially represent the body part containing the user's biometric information. The orientation judging unit 11 performs labeling on the set of subject candidate pixels, and determines that the region formed by connecting the subject candidate pixels is the subject region. The predetermined threshold value is, for example, 10.

Whether the value of any pixel contained in the region representing the user's hand is higher or lower than the value of any pixel contained in the background region is determined by how the biometric information acquiring unit 4 is configured.

Accordingly, when the value of any pixel contained in the region representing the user's hand is lower than the value of any pixel contained in the background region, the orientation judging unit 11 detects any pixel whose pixel value is lower than the threshold value as being a subject candidate pixel.

The orientation judging unit 11 obtains suitability judging metrics as metrics for judging whether the orientation of the body part containing the biometric information captured in the biometric image is suitable or not. If any one of the suitability judging metrics indicates that the user's hand captured in the biometric image is so small that it is difficult to identify the details of the vein pattern, the orientation judging unit 11 determines that the orientation of the body part is not suitable. Further, if any one of the suitability judging metrics indicates that a portion of the hand containing the vein pattern to be used for matching is missing from the biometric image, the orientation judging unit 11 determines that the orientation of the body part is not suitable. On the other hand, if all the suitability judging metrics indicate that the vein pattern to be used for matching can be detected from the user's hand captured in the biometric image, the orientation judging unit 11 determines that the orientation of the body part is suitable.

In the present embodiment, the orientation judging unit 11 computes the area and the center of the subject region as one example of the suitability judging metric. The orientation judging unit 11 may compute, as another example of the suitability judging metric, the number of pixels touching each image edge of the biometric image among the pixels contained in the subject region. For example, if the center of the subject region is located within a predetermined distance from one of the image edges of the biometric image, the orientation judging unit 11 determines that the orientation of the body part is not suitable. The predetermined distance may be chosen to be, for example, one half of the average value of the width of the subject region on the biometric image when the user's hand is placed in a suitable position relative to the biometric information acquiring unit 4.

Further, if the difference between the number of pixels contained in the subject region and touching one of the left and right edges of the biometric image and the number of pixels contained in the subject region and touching the other edge of the biometric image is not smaller than a predetermined threshold value, the orientation judging unit 11 may determine that the orientation of the body part is not suitable. The predetermined threshold value may be chosen to be, for example, one third or one quarter of the vertical length of the subject region on the biometric image.

Furthermore, if the area of the subject region is smaller than a minimum allowable area calculated by multiplying a reference area by a predetermined coefficient, the orientation judging unit 11 may determine that the orientation of the body part is not suitable. The reference area refers to the average area of the subject region on the biometric image when the user's hand is placed in a suitable position relative to the biometric information acquiring unit 4. The minimum allowable area corresponds to the minimum area of the subject region at which the details of the vein pattern to be used for matching can be identified on the biometric image, and may be chosen, for example, to fall within a range of values calculated by multiplying the reference area by 0.5 to 0.8.

When it is determined that the orientation of the body part is not suitable, the orientation judging unit 11 retrieves from the storage unit 6 a guidance message indicating the need to recapture the biometric information and directing the user to the correct position of the hand, and causes the display unit 2 to display the guidance message. Then, the biometric information of the user is recaptured by the biometric information acquiring unit 4. The orientation judging unit 11 then performs the above-described process on the recaptured biometric image. On the other hand, when it is determined that the orientation of the body part is suitable, the orientation judging unit 11 passes the biometric image to the matching data generating unit 12 along with the information indicating the subject region. The information indicating the subject region may be, for example, a binary image having the same size as the biometric image; in this binary image, the value of any pixel contained in the subject region is set, for example, to "1", and the value of any pixel contained in the background region is set, for example, to "0".

The matching data generating unit 12 generates matching data representing the features of the biometric information contained in the biometric image. For example, when the biometric authentication apparatus performs the matching by minutiae matching, the matching data generating unit 12 extracts from the biometric image the feature points (referred to as minutiae) to be used for minutiae matching. Then, the matching data generating unit 12 generates the matching data by taking the positions or kinds of the feature points.

For that purpose, the matching data generating unit 12 detects, from within the subject region, a vein region made up of pixels representing the veins and a non-vein region made up of pixels not representing the veins. In the present embodiment, the value of any pixel contained in the vein region is lower than the value of any pixel contained in the non-vein region. In view of this, the matching data generating unit 12 binarizes the subject region so that the vein region is represented, for example, by a set of pixels having pixel values not larger than a second binarization threshold value and the non-vein region by a set of pixels having pixel values larger than the second binarization threshold value. The second binarization threshold value is, for example, a predetermined fixed value (for example, 150), or alternatively, it is set equal to the average pixel value of the pixels contained in the subject region or the value determined by applying discriminant analysis to the values of the pixels contained in the subject region.

Next, the matching data generating unit 12 applies, for example, thinning to the set of pixels having pixel values corresponding to the veins in the binarized subject region, and thereby generates a thinned binary image in which the veins are thinned. After that, the matching data generating unit 12 scans the thinned binary image by using a plurality of templates corresponding to the endings or bifurcations of the veins, and detects the position on the thinned binary image where it matches one of the templates. Then, the matching data generating unit 12 extracts the pixel at the center of the detected position as a minutia.

The matching data generating unit 12 may extract minutiae from the biometric image by using any other known method that obtains veins' endings or bifurcations as minutiae. Further, the matching data generating unit 12 may obtain other feature quantities representing the features of the vein pattern on the biometric image as the matching data. For example, the matching data generating unit 12 may divide the subject region into a plurality of blocks, and may obtain data representing the number of veins in each block as the matching data.

On the other hand, when the biometric authentication apparatus performs the matching by pattern matching, the matching data generating unit 12 may generate the matching data by taking the biometric image itself or by segmenting from the biometric image a region containing the vein region on the biometric image. Further, the matching data generating unit 12 may take as the matching data an image created by applying processing such as edge enhancement or unevenness correction to the entire biometric image or a portion of the biometric image.

The matching data generating unit 12 passes the matching data to the registration unit 16. When executing the biometric authentication process, the matching data generating unit 12 passes the matching data to the matching unit 13.

The registration unit 16 acquires via the input unit 3 the user name of the user to be registered. Then, the registration unit 16 sets a user identification number for uniquely identifying the user. Further, the registration unit 16 sets the matching data received from the matching data generating unit 12 as initial matching data R0. Then, the registration unit 16 creates two representative matching data R1 and R2 by duplicating the initial matching data R0. The representative matching data R1 and R2 are each updated during the execution of the biometric authentication process until the data comes to represent the biometric information at one or the other end of the variation range over which the condition of the body part containing the registered user's biometric information varies due to cyclic environmental variations. Then, the registration unit 16 stores the initial matching data R0 and the two representative matching data R1 and R2 in the storage unit 6 as the information for the registered user along with the user name and user identification number. The user is thus registered as the registered user in the biometric authentication apparatus 1.

(Biometric Authentication Process)

Next, a description will be given of the biometric authentication process for determining whether the user is to be authenticated as being the registered user or not. In the present embodiment, the biometric authentication apparatus 1 performs the biometric authentication process in accordance with the so-called one-to-one authentication method. For that purpose, during the execution of the biometric authentication process, the processing unit 7 receives the input biometric image from the biometric information acquiring unit 4 and also receives via the input unit 3 the user name or user identification number of the user to be authenticated.

As in the registration process, the orientation judging unit 11 judges, based on the input biometric image, whether the orientation of the body part containing the biometric information of the user wishing to be authenticated is suitable or not. If the orientation is not suitable, the orientation judging unit 11 instructs the biometric information acquiring unit 4 to reacquire the input biometric image. Then, based on the reacquired input biometric image, the orientation judging unit 11 once again judges whether the orientation of the body part containing the biometric information of the user is suitable or not. If the orientation of the body part is suitable, the matching data generating unit 12 computes, from the input biometric image, input matching data V which is the matching data representing the features of the user's biometric information. The matching data generating unit 12 passes the input matching data V to the matching unit 13 and the updating unit 15.

The matching unit 13 that received the user name or user identification number retrieves from the storage unit 6 the initial matching data R0 and representative matching data R1 and R2 associated with the registered user corresponding to the user name or user identification number. The matching unit 13 then matches the user's input matching data V against the initial matching data R0 and representative matching data R1 and R2 associated with the registered user. Then, the matching unit 13 obtains, as a result of the matching, a matching score that indicates the degree of similarity between the two matching data matched against each other; the matching score is computed for each of the initial matching data R0 and representative matching data R1 and R2 associated with the registered user.

The matching unit 13 can perform the matching by using such techniques as minutiae matching or pattern matching. The following describes how the matching score S0 between the input matching data V and the initial matching data R0 is computed. The matching scores S1 and S2 between the input matching data V and the respective representative matching data R1 and R2 are also computed in the same manner.

When using the minutiae matching, the matching unit 13 obtains the number of minutiae that match between the registered user's initial matching data R0 and the user's input matching data V for the vein pattern. The matching unit 13 can then compute the matching score S0 by dividing the number of matching minutiae by the number of minutiae extracted for the user's vein pattern. On the other hand, when using the pattern matching, the matching unit 13 computes normalized cross-correlation values while changing the relative position between the input biometric image as the matching data V and the biometric image containing the registered user's vein pattern as the initial matching data R0. Then, the matching unit 13 determines the matching score S0 by taking the maximum value of the normalized cross-correlation values.

The matching unit 13 obtains a maximum value Smax among the matching scores S0, S1, and S2 computed for the respective matching data of the registered user. The matching unit 13 passes the maximum value Smax of the matching score and the user identification number of the registered user to the authentication judging unit 14.

Based on the result of the matching by the matching unit 13, the authentication judging unit 14 judges whether the user is to be authenticated as being the registered user or not. In the present embodiment, if the maximum value Smax of the matching score is not smaller than an authentication judging threshold value, the authentication judging unit 14 determines that the biometric information of the user matches the biometric information of the registered user designated for matching. Then, the authentication judging unit 14 authenticates the user as matching the registered user. After authenticating the user, the authentication judging unit 14 passes the result of the authentication to the processing unit 7.

On the other hand, if the maximum value of the matching score is smaller than the authentication judging threshold value, the authentication judging unit 14 determines that the biometric information of the user does not match the biometric information of the registered user designated for matching. In this case, the authentication judging unit 14 does not authenticate the user. The authentication judging unit 14 notifies the processing unit 7 of the result of the authentication indicating the failure to authenticate the user. Then, the processing unit 7 causes the display unit 2 to display authentication result information indicating the result of the authentication.

It is preferable to set the authentication judging threshold value to such a value that the authentication judging unit 14 succeeds to authenticate the user only when the user is a legitimate registered user. It is also preferable to set the authentication judging threshold value to such a value that the authentication judging unit 14 fails to authenticate the user when the user is a person other than a legitimate registered user. For example, the authentication judging threshold value may be set equal to a value calculated by multiplying the difference between the maximum and minimum values that the matching score can take by 0.7, and by adding the resulting product to the minimum value of the matching score.

The updating unit 15 updates the representative matching data R1 and R2 of the registered user until the representative matching data R1 and R2 come to represent the biometric information at the respective ends of the variation range over which the condition of the body part containing the biometric information of the registered user varies due to cyclic environmental variations. Only when the user has been authenticated successfully, does the updating unit 15 update the representative matching data R1 and R2 by using the input matching data V obtained for that user.

In the present embodiment, as long as the matching score S0 computed for the initial matching data R0 continues to decrease, the updating unit 15 continues to replace the representative matching data R1, R2 by the input matching data V obtained when the user has been authenticated successfully. When the matching score reaches a minimum value, the updating unit 15 takes the representative matching data R1, R2 as the matching data representing the biometric information of the registered user at one end of the variation range over which the condition of the body part containing the biometric information of the registered user varies due to cyclic environmental variations.

Figure 3:
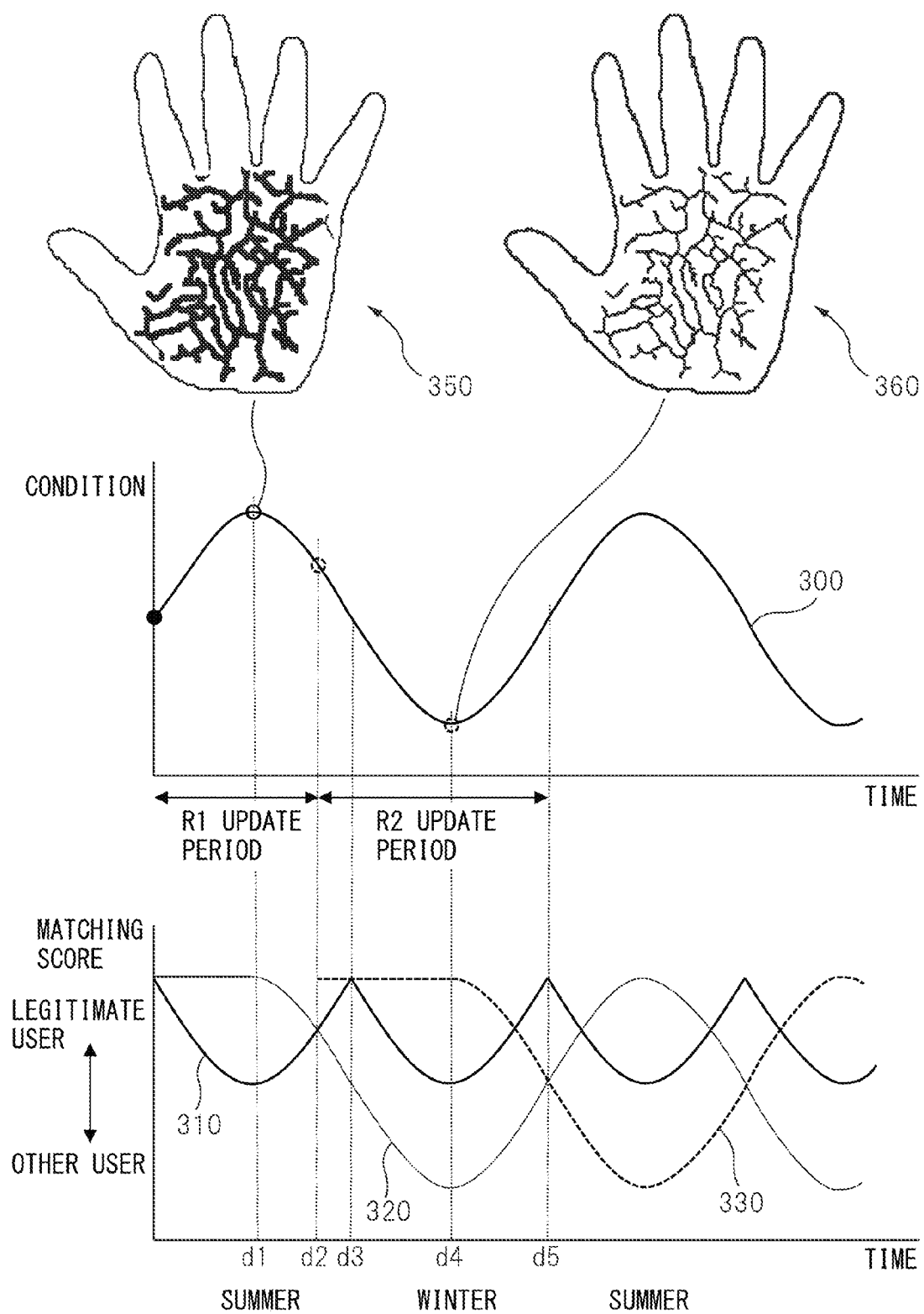
FIG. 3 is a diagram illustrating one example of the relationship between the seasonal variation of a body part containing biometric information and the seasonal variation of a matching score computed for each registered matching data.

FIG. 3 is a diagram illustrating one example of the relationship between the seasonal variation of the body part containing the biometric information and the seasonal variation of the matching score computed for each registered matching data. In the example illustrated in FIG. 3, it is assumed that the matching data of the registered user is registered in spring and therefore that the condition of the body part containing the biometric information of the registered user at the time of the registration is located near the center of the variation range over which the condition of that body part varies due to cyclic seasonal variations.

In the graph depicted in the upper part of FIG. 3, the abscissa represents the time (season), and the ordinate represents the condition of the body part containing the biometric information of the registered user. Curve 300 depicts how the condition of the body part containing the biometric information of the registered user changes over time. On the other hand, in the graph depicted in the lower part of FIG. 3, the abscissa represents the time (season), and the ordinate represents the matching scores computed between the input matching data V and the three registered matching data R0, R1, and R2, respectively. Curve 310 depicts how the matching score S0 for the initial matching data R0 changes over time. Curve 320 depicts how the matching score S1 for the matching data R1 which is updated earlier than the matching data R2 changes over time. On the other hand, curve 330 depicts how the matching score S2 for the matching data R2 which is updated later than the matching data R1 changes over time.

As depicted by the curve 300, as the summer approaches, the condition of the body part containing the biometric information of the registered user approaches one end of the variation range of the condition of that body part. In the present embodiment, since the biometric information is the palm vein pattern, the blood vessels expand as the summer approaches and the temperature rises. As a result, the difference between the condition of the body part containing the biometric information of the registered user at the time of the registration and the condition of the body part containing the biometric information of the registered user at the time of the biometric authentication becomes greater as the summer approaches. Accordingly, as depicted by the curve 310, the matching score S0 for the initial matching data R0 continues to decrease with the approach of summer. During this period, the representative matching data R1 which is updated first is used for biometric authentication, and is updated each time the biometric authentication is successfully done. Since the representative matching data R1 is updated to reflect the latest condition of the body part containing the biometric information of the registered user, the matching score S1 obtained for the representative matching data R1 exhibits a relatively high value, as depicted by the curve 320. It is assumed that, at time d1, the condition of the body part containing the biometric information of the registered user reaches one end of the variation range. At time d1, the vein thickness becomes maximum as illustrated in the hand 350, and the matching score S0 for the initial matching data R0 reaches a minimum. After time d1, the difference between the condition of the body part containing the biometric information of the registered user at the time of the initial registration and the condition of the body part containing the biometric information of the registered user at the time of the biometric authentication gradually decreases, so that the matching score S0 for the initial matching data R0 changes from decreasing to increasing. As a result, after time d1, the representative matching data R1 is no longer updated. Then, at time d2 when it is confirmed that the matching score S0 for the initial matching data R0 reaches its minimum value at time d1, the updating unit 15 stops updating the representative matching data R1. In other words, the representative matching data R1 at time d1 is thereafter held in the storage unit 6 as the matching data representing the biometric information of the registered user at one end of the variation range over which the condition of the body part varies due to cyclic seasonal variations.

When the updating of the representative matching data R1 is stopped, the updating unit 15 starts to update the other representative matching data R2. From time d2 to time d3 when the difference between the condition of the body part containing the biometric information of the registered user at the time of the initial registration and the condition of the body part containing the biometric information of the registered user at the time of the biometric authentication decreases to zero, the matching score S0 for the initial matching data R0 continues to increase. Accordingly, the representative matching data R2 is not updated until time d3. After passing time d3, the difference between the condition of the body part containing the biometric information of the registered user at the time of the initial registration and the condition of the body part containing the biometric information of the registered user at the time of the biometric authentication begins to increase. As a result, after time d3, the matching score S0 for the initial matching data R0 decreases, as depicted by the curve 330. Likewise, after time d2, the matching score S1 for the representative matching data R1 constantly decreases. Accordingly, after time d3, the representative matching data R2 is updated by the input matching data V. Then, it is assumed that, at time d4 (for example, winter), the condition of the body part containing the biometric information of the registered user reaches the other end of the variation range. At time d4, the vein thickness becomes minimum as illustrated in the hand 360, and the matching score S0 for the initial matching data R0 again reaches a minimum. After time d4, the difference between the condition of the body part containing the biometric information of the registered user at the time of the initial registration and the condition of the body part containing the biometric information of the registered user at the time of the biometric authentication gradually decreases, so that the matching score S0 changes from decreasing to increasing. The matching score S1 also changes from decreasing to increasing. As a result, after time d4, the representative matching data R2 is no longer updated.

Then, at time d5 when it is confirmed that the matching scores S0 and S1 both reach their minimum values at time d4, the updating unit 15 stops updating the representative matching data R2. In other words, the representative matching data R2 at time d4 is thereafter held in the storage unit 6 as the matching data representing the biometric information of the registered user at the other end of the variation range over which the condition of the body part varies due to cyclic seasonal variations.

Figure 4:
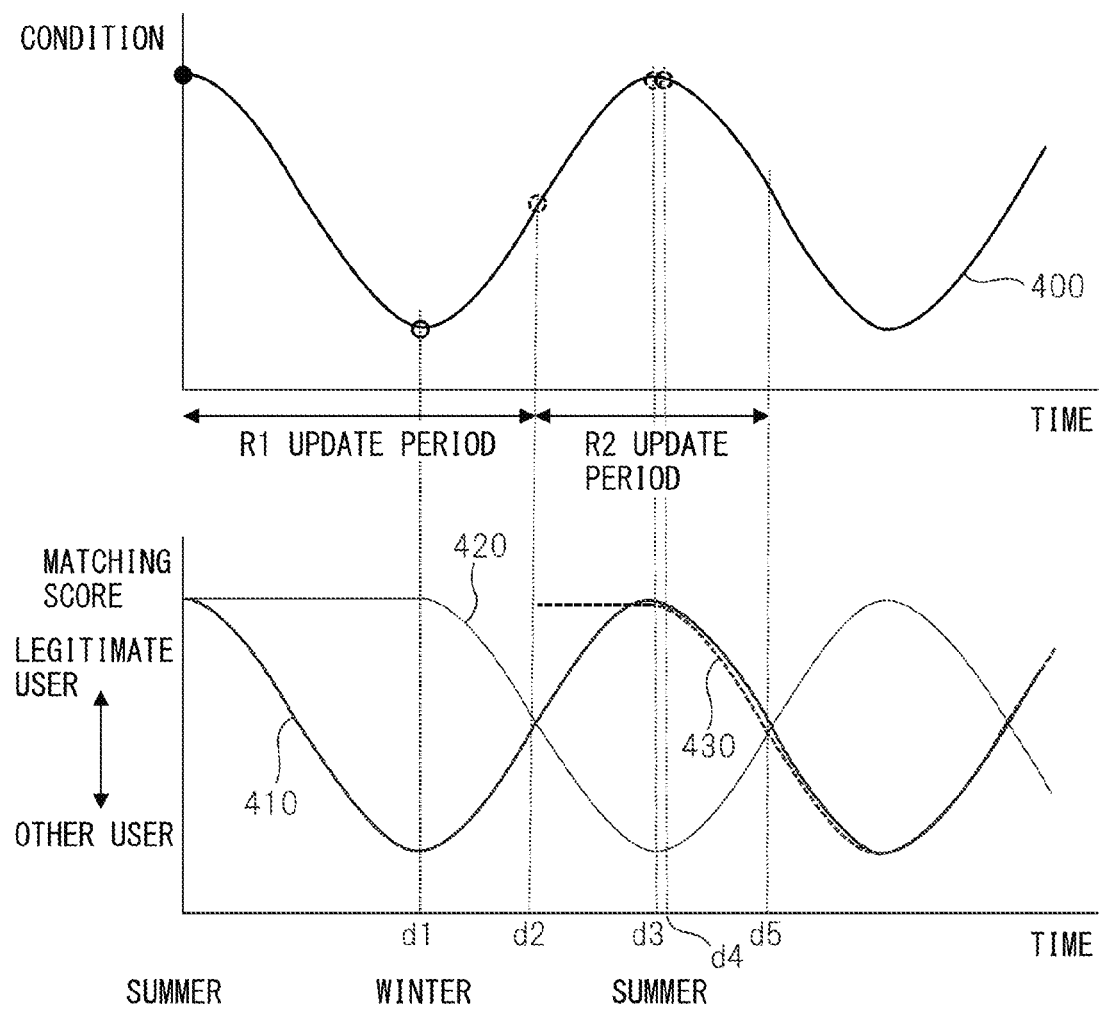
FIG. 4 is a diagram illustrating another example of the relationship between the seasonal variation of the body part containing the biometric information and the seasonal variation of the matching score computed for each registered matching data.

FIG. 4 is a diagram illustrating another example of the relationship between the seasonal variation of the body part containing the biometric information and the seasonal variation of the matching score computed for each registered matching data. In the example illustrated in FIG. 4, it is assumed that the matching data of the registered user is registered in summer and therefore that the condition of the body part containing the biometric information of the registered user at the time of the registration is located at one end of the variation range over the condition of that body part varies due to cyclic seasonal variations.

In the graph depicted in the upper part of FIG. 4, the abscissa represents the time (season), and the ordinate represents the condition of the body part containing the biometric information of the registered user. Curve 400 depicts how the condition of the body part containing the biometric information of the registered user changes over time. On the other hand, in the graph depicted in the lower part of FIG. 4, the abscissa represents the time (season), and the ordinate represents the matching scores computed between the input matching data V obtained from the input biometric image at the time of the biometric authentication and the matching data R0, R1, and R2 of the registered user, respectively. Curve 410 depicts how the matching score S0 for the initial matching data R0 changes over time. Curve 420 depicts how the matching score S1 for the matching data R1 which is updated earlier than the matching data R2 changes over time. On the other hand, curve 430 depicts how the matching score S2 for the matching data R2 which is updated later than the matching data R1 changes over time.

As depicted by the curve 400, as the winter approaches, the condition of the body part containing the biometric information of the registered user approaches the other end of the variation range of the condition of that body part. In the present embodiment, since the biometric information is the palm vein pattern, the blood vessels contract as the temperature lowers. As a result, the difference between the condition of the body part containing the biometric information of the registered user at the time of the registration and the condition of the body part containing the biometric information of the registered user at the time of the biometric authentication becomes greater as the winter approaches. Accordingly, as depicted by the curve 410, the matching score for the initially registered matching data continues to decrease with the approach of winter. During this period, the representative matching data R1 which is updated first is used for biometric authentication, and is updated each time the biometric authentication is successfully done. Since the representative matching data R1 is thus updated to reflect the latest condition of the body part containing the biometric information of the registered user, the matching score S1 obtained for the representative matching data R1 exhibits a relatively high value, as depicted by the curve 420. It is assumed that, at time d1, the condition of the body part containing the biometric information of the registered user reaches the other end of the variation range. At time d1, the matching score S0 reaches a minimum. After time d1, the difference between the condition of the body part containing the biometric information of the registered user at the time of the registration and the condition of the body part containing the biometric information of the registered user at the time of the biometric authentication gradually decreases, so that the matching score S0 changes from decreasing to increasing. As a result, after time d1, the representative matching data R1 is no longer updated. Then, at time d2 when it is confirmed that the matching score S0 reaches its minimum value at time d1, the updating unit 15 stops updating the representative matching data R1. That is, the representative matching data R1 at time d1 is thereafter held in the storage unit 6 as the matching data representing the biometric information of the registered user at the other end of the variation range over which the condition of the body part varies due to cyclic seasonal variations.

When the updating of the representative matching data R1 is stopped, the updating unit 15 starts to update the other representative matching data R2. From time d2 to time d3 when the difference between the condition of the body part containing the biometric information of the registered user at the time of the registration and the condition of the body part containing the biometric information of the registered user at the time of the biometric authentication decreases to zero, the matching score S0 for the initial matching data R0 continues to increase. Accordingly, the representative matching data R2 is not updated until time d3. After passing time d3, the difference between the condition of the body part containing the biometric information of the registered user at the time of the initial registration and the condition of the body part containing the biometric information of the registered user at the time of the biometric authentication begins to increase. As a result, after time d3, the matching score S0 decreases, as depicted by the curve 430. Likewise, the matching score S1 also decreases. Accordingly, after time d3, the representative matching data R2 is updated. Then, it is assumed that, at time d4 (for example, the hottest day), the condition of the body part containing the biometric information of the registered user reaches the one end of the variation range which is nearer to the condition at the time of the registration. At time d4, the matching score S0 again reaches a minimum. After time d4, the difference between the condition of the body part containing the biometric information of the registered user at the time of the initial registration and the condition of the body part containing the biometric information of the registered user at the time of the biometric authentication gradually decreases, so that the matching score S0 changes from decreasing to increasing. As a result, after time d4, the representative matching data R2 is no longer updated. Then, at time d5 when it is confirmed that the matching score S0 for the initial matching data R0 reaches its minimum value at time d4, the updating unit 15 stops updating the representative matching data R2.

It can be seen that, in the example illustrated in FIG. 4 as well as the example illustrated in FIG. 3, the representative matching data R1 and R2 held after stopping the updating represent the condition of the body part containing the registered user's biometric information at the respective ends of its variation range. Since, after time d4, the variation range of the condition of the body part is defined by the representative matching data R1 and R2, the initial matching data R0 may be deleted from the storage 6 after the updating of both representative matching data R1 and R2 has been stopped.

Figure 5:
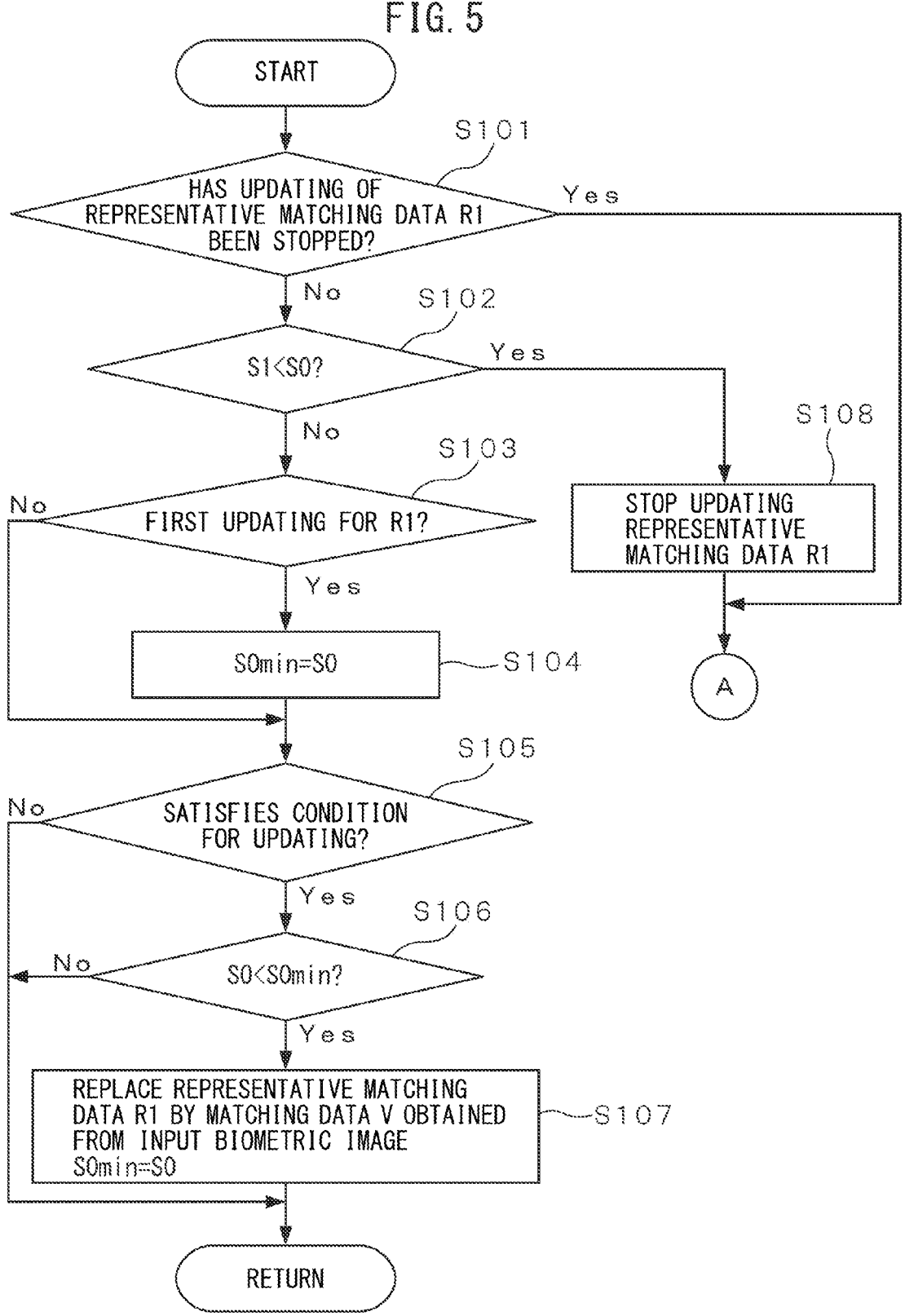
FIG. 5 is an operation flowchart illustrating a matching data updating process.
Figure 6:
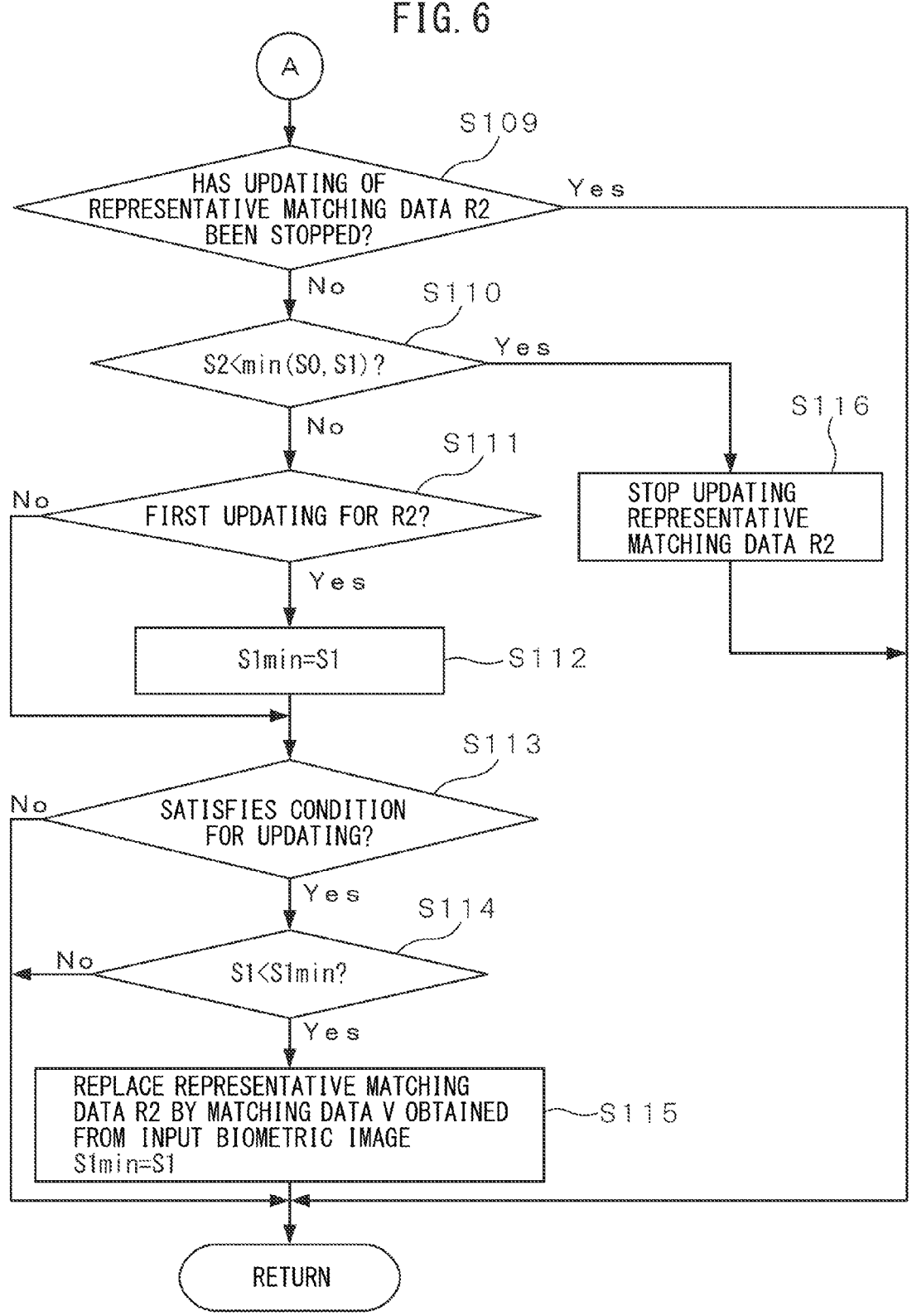
FIG. 6 is an operation flowchart illustrating the matching data updating process.

FIGS. 5 and 6 are an operation flowchart illustrating the matching data updating process performed by the updating unit 15. The matching data updating process is carried out each time the biometric authentication process is performed.

The updating unit 15 determines whether the updating of the representative matching data R1 has been stopped or not (step S101). For example, if an R1 update-stop flag which indicates that the updating of the representative matching data R1 has been stopped is stored in the storage unit 6, the updating unit 15 determines that the updating of the representative matching data R1 has been stopped.

If the updating of R1 has not yet been stopped (No in step S101), the updating unit 15 proceeds to determine whether the matching score S1 obtained for the representative matching data R1 is smaller than the matching score S0 obtained for the initial matching data R0 (step S102). If the matching score S1 is not smaller than the matching score S0 (No in step S102), then the updating unit 15 determines whether the current updating is the first updating for R1 (step S103). If it is the first updating (Yes in step S103), the updating unit 15 takes the matching score S0, obtained from the current cycle of the biometric authentication process, as being the minimum value S0min of the matching score obtained for the initial matching data R0 at the current time (step S104).

After step S104, or after it is determined in step S103 that the current updating is not the first updating (No in step S103), the updating unit 15 determines whether the condition for updating is satisfied or not (step S105).

The condition for updating is set in order to avoid the risk of erroneously replacing the matching data of the registered user with the matching data of some other user. The updating unit 15 determines whether at least one of the following conditions is satisfied as the condition for updating.

The maximum value of the matching score obtained from the current cycle of the biometric authentication process is higher than an update permit threshold value which is higher than the authentication judging threshold value. The update permit threshold value is set, for example, equal to the authentication judging threshold value multiplied by 1.1 to 1.2.

The difference between the matching score S1 obtained from the previous cycle of the biometric authentication process and the matching score S1 obtained from the current cycle of the biometric authentication process is smaller than a predetermined threshold value. The predetermined threshold value is set, for example, equal to one hundredth of the range of values that the matching score can take.

The representative matching data R1 has been updated in at least one of a predetermined number (for example, five) of most recently performed update cycles.

If the condition for update is satisfied (Yes in step S105), the updating unit 15 determines whether the matching score S0 obtained from the current cycle of the biometric authentication process is smaller than the minimum value S0min of the previous matching score (step S106). If the matching score S0 is smaller than the minimum value S0min of the previous matching score (Yes in step S106), the updating unit 15 replaces the representative matching data R1 by the input matching data V obtained from the current cycle of the biometric authentication process. Further, the updating unit 15 replaces the minimum value S0min of the matching score by the matching score S0 (step S107). After step S107, the updating unit 15 terminates the updating process.

On the other hand, if the condition for updating is not satisfied in step S105 (No in step S105), the updating unit 15 terminates the updating process without updating the representative matching data R1. If, in step S106, the matching score S0 is not smaller than the minimum value S0min of the matching score (No in step S106), the updating unit 15 also terminates the updating process without updating the representative matching data R1.

On the other hand, if it is determined in step S102 that the matching score S1 for the representative matching data R1 is smaller than the matching score S0 for the initial matching data R0 (Yes in step S102), the updating unit 15 stops updating the representative matching data R1 (step S108). Then, the updating unit 15 stores in the storage unit 6, for example, the R1 update-stop flag indicating that the updating of the representative matching data R1 has been stopped. The representative matching data R1 now carries the matching data corresponding to the case where the matching score S0 exhibits a minimum value, i.e., the matching data representing the condition of the body part that most differs from the condition of the body part represented by the initial matching data R0. It can therefore be deduced that the representative matching data R1 represents the condition of the body part at one end of the variation range over which the condition of the body part containing the biometric information varies due to environmental variations. Accordingly, by stopping the updating of the representative matching data R1 as described above, the updating unit 15 can store in the storage unit 6 the matching data representing the condition of the body part at one end of the variation range over which the condition of the body part containing the biometric information varies due to environmental variations. Further, a plurality of minima may appear in the matching score S0 due to such effects as noise or environmental variations (for example, variations in weather and temperature). Therefore, the updating unit 15 does not stop updating the representative matching data R1 until the matching score S1 becomes smaller than the matching score S0, i.e., until the condition of the user's body part at the time of the authentication comes to a condition intermediate between the condition of the body part at the time of the initial registration and the condition of the body part at one end of its variation range. In this way, the updating unit 15 can properly locate the minimum value of the matching score S0.

As illustrated in FIG. 6, after step S108, or after it is determined in step S101 that the updating of R1 has been stopped (Yes in step S101), the updating unit 15 proceeds to determine whether the updating of the representative matching data R2 has been stopped or not (step S109). For example, if an R2 update-stop flag which indicates that the updating of the representative matching data R2 has been stopped is stored in the storage unit 6, the updating unit 15 determines that the updating of the representative matching data R2 has been stopped.

If the updating of R2 has been stopped (Yes in step S109), the updating unit 15 terminates the updating process.

On the other hand, if the updating of R2 has not yet been stopped (No in step S109), the updating unit 15 proceeds to determine whether the matching score S2 for the representative matching data R2 is smaller than both the matching scores S0 and S1 obtained for the initial matching data R0 and the representative matching data R1, respectively (step S110). If the matching score S2 is not smaller than the matching score S0 or S1 (No in step S110), then the updating unit 15 determines whether the current updating is the first updating for the representative matching data R2 (step S111). If it is the first updating (Yes in step S111), the updating unit 15 takes the matching score S1 as being the minimum value S1min of the matching score obtained for the representative matching data R1 at the current time (step S112).

After step S112, or after it is determined in step S111 that the current updating is not the first updating (No in step S111), the updating unit 15 determines whether the condition for updating is satisfied or not (step S113). The condition for updating R2 may be the same as the condition for updating R1.

If the condition for updating is satisfied (Yes in step S113), the updating unit 15 determines whether the matching score S1 obtained from the current cycle of the biometric authentication process is smaller than the minimum value S1min of the previous matching score (step S114). If the matching score S1 is smaller than the minimum value S1min of the previous matching score (Yes in step S114), the updating unit 15 replaces the representative matching data R2 by the input matching data V obtained from the current cycle of the biometric authentication process. Further, the updating unit 15 replaces the minimum value S1min of the matching score by the matching score S1 (step S115). After step S115, the updating unit 15 terminates the updating process.

On the other hand, if the condition for updating is not satisfied in step S113 (No in step S113), the updating unit 15 terminates the updating process without updating the representative matching data R2. If, in step S114, the matching score S1 is not smaller than the minimum value S1min of the matching score (No in step S114), the updating unit 15 also terminates the updating process without updating the representative matching data R2.

On the other hand, if it is determined in step S110 that the matching score S2 is smaller than both the matching scores S0 and S1 (Yes in step S110), the updating unit 15 stops updating the representative matching data R2 (step S116). Then, the updating unit 15 stores in the storage unit 6, for example, the R2 update-stop flag indicating that the updating of the representative matching data R2 has been stopped. After that, the updating unit 15 terminates the updating process. Once step S116 has been carried out, neither R1 nor R2 is thereafter updated in the updating process because both the R1 update-stop flag and the R2 update-stop flag are stored in the storage unit 6.

FIG. 7 is an operation flowchart of the biometric authentication process which is performed under the control of a computer program executed on the processing unit 7.

As illustrated in FIG. 7, the processing unit 7 acquires from the biometric information acquiring unit 4 the input biometric image containing the biometric information of the user wishing to be authenticated. Further, the processing unit 7 acquires from the input unit 3 the user name or user identification number of the registered user to be matched (step S201). Then, based on the position and size of the subject region of the body part containing the user's biometric information carried in the input biometric image, the orientation judging unit 11 in the processing unit 7 judges whether the orientation of the body part is suitable or not (step S202). If the orientation of the body part is not suitable (No in step S202), the orientation judging unit 11 retrieves from the storage unit 6 a guidance message indicating the need to recapture the biometric information and directing the user to the correct position of the hand, and causes the display unit 2 to display the guidance message. Then, the processing unit 7 returns to step S201 to repeat the above process.

On the other hand, if the orientation of the body part is suitable (Yes in step S202), the matching data generating unit 12 in the processing unit 7 computes the input matching data V from the input biometric image (step S203). The matching data generating unit 12 passes the input matching data V to the matching unit 13 and updating unit 15 in the processing unit 7.

The matching unit 13 obtains a maximum value Smax from among the matching scores S0, S1, and S2 computed between the input matching data V and the respective matching data R0, R1, and R2 of the registered user corresponding to the input user name or user identification number (step S204). Then, the matching unit 13 passes the maximum value Smax and the identification number of the registered user to the authentication judging unit 14 in the processing unit 7. Further, the matching unit 13 passes the matching scores S0, S1, and S2 to the updating unit 15.

The authentication judging unit 14 judges whether or not the maximum value Smax of the matching score is larger than or equal to the authentication judging threshold value (step S205). If the maximum value Smax of the matching score is smaller than the authentication judging threshold value (No in step S205), the authentication judging unit 14 does not authenticate the user, and causes the display unit 2 to display the judging result (step S206). On the other hand, if the maximum value Smax of the matching score is larger than or equal to the authentication judging threshold value (Yes in step S205), the authentication judging unit 14 authenticates the user as being the registered user (step S207). Then, the updating unit 15 in the processing unit 7 carries out the matching data updating process (step S208).

After step S206 or S208, the processing unit 7 terminates the biometric authentication process.

As has been described above, the biometric authentication apparatus registers in advance, for each registered user, the representative matching data that represent the conditions of the registered user's body part, each representing two different portions of the variation range over which the condition of the body part containing the biometric information varies due to cyclic environmental variations. Then, by performing the matching process using the representative matching data, the biometric authentication apparatus can perform the matching process by using the matching data representing the condition close to the condition of the body part presented for biometric authentication. In this way, the biometric authentication apparatus can suppress the degradation of authentication accuracy caused by variations that can occur in the condition of the body part containing the biometric information due to cyclic environmental variations. Further, as described above, the biometric authentication apparatus stops updating the representative matching data after determining the representative matching data that represent the conditions each representing the corresponding one of the two different portions of the variation range of the condition of the body part containing the biometric information. Therefore, even after some time has elapsed from the last update of the representative matching data, the biometric authentication apparatus can perform the matching process by using the matching data representing the condition close to the condition of the body part presented for biometric authentication.

Next, a biometric authentication apparatus according to a second embodiment will be described. The biometric authentication apparatus according to the second embodiment updates or stops updating the representative matching data R1 and R2, based on the variations of environmental parameters representing the environmental variations, for example, climate data such as temperature or humidity, that may affect the condition of the body part containing the biometric information.

FIG. 8 is a diagram schematically illustrating the configuration of the biometric authentication apparatus according to the second embodiment. The biometric authentication apparatus 10 according to the second embodiment includes a display unit 2, an input unit 3, a biometric information acquiring unit 4, a communication unit 5, a storage unit 6, a processing unit 7, and an environmental information acquiring unit 8. In FIG. 8, the component elements of the biometric authentication apparatus 10 are designated by the same reference numerals as those used to designate the corresponding component elements of the biometric authentication apparatus 1 according to the first embodiment. The biometric authentication apparatus 10 of the second embodiment differs from the biometric authentication apparatus 1 of the first embodiment by the inclusion of the environmental information acquiring unit 8 and in the operation of the processing unit 7. The following description therefore deals with the environmental information acquiring unit 8 and the processing unit 7.

At the time of the initial registration of the matching data, or each time the biometric authentication process is started, the environmental information acquiring unit 8 acquires the environmental parameters representing the environmental variations that may affect the condition of the body part containing the biometric information. For example, if the environmental parameter is the temperature, the environmental information acquiring unit 8 includes a temperature sensor, and if the environmental parameter is the humidity, the environmental information acquiring unit 8 includes a humidity sensor. Each time an environmental parameter acquisition request is received from the processing unit 7, the environmental information acquiring unit 8 acquires the requested environmental parameter, for example, by measuring the ambient temperature or humidity of the biometric authentication apparatus 10. The environmental information acquiring unit 8 passes the environmental parameter to the processing unit 7.

Alternatively, the biometric authentication apparatus 10 may acquire such environmental parameters from another apparatus via a communication network. In this case, the communication unit 5 serves as another example of the environmental information acquiring unit. The communication unit 5 may then acquire as environmental parameters the highest temperature, lowest temperature, highest humidity, or lowest humidity measured on the day the matching data was initially registered or on the day the biometric authentication process was executed.

The registration unit 16 in the processing unit 7 stores the environmental parameters acquired at the time of the initial registration of the matching data in the storage unit 6 along with the matching data R0, R1, and R2. For convenience, the environmental parameters associated with the matching data R0, R1, and R2 will hereinafter be designated as C0, C1, and C2, respectively.

In the matching data updating process illustrated in FIGS. 5 and 6, the updating unit 15 in the processing unit 7 uses, instead of the matching scores S0, S1, and S2, the absolute differences between the environmental parameters C0, C0, and C2 and the corresponding environmental parameters Cn acquired at the time of the execution of the biometric authentication process. Then, in steps S104 and S107, the updating unit 15 records the maximum value C0max of the absolute difference |Cn-C0| between C0 and Cn, instead of recording the minimum value of the matching score S0. In step S106, the updating unit 15 determines whether |Cn-C0| is larger than C0max and, if |Cn-C0| is larger than C0max, then updates the representative matching data R1 while also updating the maximum value C0max. Further, when |Cn-C0| becomes smaller than |Cn-C1| in step S102, the updating unit 15 stops updating the representative matching data R1.

Likewise, in steps S112 and S115, the updating unit 15 records the maximum value C0max of the absolute difference |Cn-C1| between C1 and Cn, instead of recording the minimum value of the matching score S1. In step S114, the updating unit 15 determines whether |Cn-C1| is larger than C0max and, if |Cn-C1| is larger than C0max, then updates the representative matching data R2 while also updating the maximum value C0max. Further, when both |Cn-C0| and |Cn-C1| become smaller than |Cn-C1| in step S110, the updating unit 15 stops updating the representative matching data R2.

According to the above embodiment, the biometric authentication apparatus can associate each representative matching data directly with the value of the environmental parameter that affects the condition of the body part represented by that representative matching data.

According to a modified example of the second embodiment, the environmental parameters may be stored on a day-by-day basis in the storage unit for one cyclic period of the cyclic environmental variations that affect the condition of the body part containing the biometric information. Then, the registration unit may retrieve from the storage unit the environmental parameters associated with the day of the registration of the matching data, and may associate the retrieved parameters with the respective matching data R0, R1, and R2. Likewise, each time the matching data updating process is executed, the updating unit may retrieve from the storage unit the environmental parameters associated with the day of the execution of the updating process, and may associate the retrieved parameters with the updated matching data.

According to another modified example of the second embodiment, the biometric authentication apparatus may select from among the registered matching data the matching data to be used in the matching process by referring to the information estimating the condition of the body part containing the biometric information. For example, the biometric authentication apparatus may acquire, via the environmental information acquiring unit, the environmental parameter at the time of the execution of the biometric authentication process as the information estimating the condition of the body part containing the biometric information. Then, the biometric authentication apparatus may select the representative matching data associated with the environmental parameter closest to the acquired environmental parameter as the matching data to be used in the matching process. The authentication judging unit then compares the computed matching score with the authentication judging threshold value and, if the matching score is larger than the authentication judging threshold value, then authenticates the user. In this modified example, since the matching unit computes the matching score only for the selected matching data, the biometric authentication apparatus can reduce the amount of computation involved in the matching process.

Further, according to a modified example of each of the above embodiments, the storage unit may store three representative matching data. For example, after stopping the updating of the representative matching data R1 and R2, the updating unit obtains the difference between the matching score S1 computed between the input matching data V and the representative matching data R1 and the matching score S2 computed between the input matching data V and the representative matching data R2. Then, the updating unit takes the input matching data V as the third representative matching data R3 when the difference has decreased to a negligible level (for example, to one hundredth or less of the maximum value that the matching score can take). In this case, the representative matching data R3 represents the biometric information taken at the center of the variation range over which the condition of the body part containing the biometric information varies due to environmental variations.

Further, the two representative matching data to be held in the storage unit need not necessarily be the matching data corresponding to the respective ends of the variation range of the condition of the body part containing the biometric information. Each representative matching data need only be made to represent the condition in one of the sub-ranges obtained by dividing the variation range of the condition of the body part containing the biometric information into the same number of smaller ranges as the number of representative matching data. For example, after obtaining the three representative matching data R1 to R3, as in the above modified example, the updating unit further obtains the difference between the matching score S1 computed between the input matching data V and the representative matching data R1 and the matching score S3 computed between the input matching data V and the representative matching data R3. Then, the updating unit takes the input matching data V as new representative matching data R4 when the difference has decreased to a negligible level. The updating unit further obtains the difference between the matching score S2 computed between the input matching data V and the representative matching data R2 and the matching score S3 computed between the input matching data V and the representative matching data R3. Then, the updating unit takes the input matching data V as new representative matching data R5 when the difference has decreased to a negligible level. In this case, the representative matching data R4 represents, for example, the condition of the body part at a temperature located at the midpoint of the upper half section of the variation range of the temperature that varies due to environmental variations, and on the other hand, the representative matching data R5 represents the condition of the body part at a temperature located at the midpoint of the lower half section of the variation range of the temperature.

According to still another modified example, the biometric authentication apparatus may perform the biometric authentication process in accordance with the so-called one-to-many authentication method. In this case, neither the user name nor the user identification number for identifying the registered user is needed in the biometric authentication process. The matching unit matches the input matching data against the representative matching data of all the registered users. Then, when the maximum value of the matching score is higher than the authentication judging threshold value, the authentication judging unit authenticates the user as being the registered user corresponding to that maximum value. Then, the updating unit need only update the representative matching data for that registered user. In this case, the condition for updating may be made stricter in order to prevent the representative matching data of the registered user from being replaced by the matching data of some other user than that registered user. For example, the update permit threshold value may be set equal to the authentication judging threshold value multiplied by 1.3 to 1.4.

The biometric authentication apparatus and the biometric authentication method disclosed in this specification are applicable to various kinds of apparatus or systems that perform biometric authentication between user biometric information and preregistered biometric information in order to permit the user to perform a desired operation. For example, the biometric authentication apparatus may be incorporated in an automated teller machine or in an input apparatus for permitting entry to a room. Such apparatus or systems include, for example, a computer system in which one or more terminals are connected to a server via a communication network. In this case, each terminal is equipped with a biometric information acquiring unit, and the biometric information acquired by the biometric information acquiring unit is transmitted to the server. Then, the server carries out the biometric information registration or biometric authentication process by implementing the functions of the processing unit according to any one of the above embodiments.

Of the various functions incorporated in the processing unit according to each of the above embodiments, the processor of each terminal may implement the functions of the orientation judging unit and the matching data generating unit. On the other hand, the processor of the server may implement the functions of the matching unit, the authentication judging unit, the updating unit, and the registration unit. This serves to alleviate the processing load on the server processor. A computer program having instructions for causing a computer to implement the various functions of the processing unit according to each of the above embodiments may be provided in the form recorded on a computer readable recording medium such as a nonvolatile semiconductor memory, a magnetic recording medium, or an optical recording medium. However, the recording medium here does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication apparatus comprising:
a storage device configured to store first matching data for a registered user, first representative matching data that is generated based on input matching data for a user obtained during a period when the degree of similarity between the input matching data and the first matching data is equal to or larger than a threshold value and second representative matching data that is generated based on the input matching data obtained during a period when the degree of similarity between the input matching data and the first matching data is larger than the degree of similarity between the input matching data and the first representative matching data;
a biometric sensor configured to generate a biometric image that represents biometric information of a user; and
a processor configured to generate, from the biometric image, the input matching data;
match the input matching data against at least one of the first and second representative matching data; and
judge, based on a result of the matching, whether the user is to be authenticated as being the registered user or not.

2. The biometric authentication apparatus according to claim 1, wherein the matching the input matching data against at least one of the first and second representative matching data computes a first matching score that indicates the degree of similarity between the first matching data and the input matching data, and wherein
the processor further configured to obtain a minimum value of the first matching score by examining temporal variation of the first matching score computed each time the user is authenticated as being the registered user, and take the input matching data corresponding to the minimum value as the first representative matching data.

3. The biometric authentication apparatus according to claim 2, wherein the storage device stores the first matching data and stores second matching data which is updated by the input matching data, and
the processor further configured to, when the first matching score computed for the input matching data obtained from the most recent biometric image is smaller than the minimum value of the first matching score computed previously, replace the second matching data by the input matching data, and when the first matching score is larger than a second matching score that indicates the degree of similarity between the input matching data obtained from the most recent biometric image and the second matching data, take the second matching data as the second representative matching data.

4. The biometric authentication apparatus according to claim 1, further comprising:
an environmental information acquiring device which, each time the input matching data is computed, acquires an environmental parameter representing the environment at the time of the generation of the input matching data; and wherein
the processor further configured to take, as the first or second representative matching data, the input matching data obtained from the biometric image corresponding to a minimum value or a maximum value of the environmental parameter.

5. The biometric authentication apparatus according to claim 1, wherein for each of the first and second representative matching data, the matching the input matching data against at least one of the first and second representative matching data computes a matching score indicating the degree of similarity between the input matching data and the representative matching data, and the judging whether the user is to be authenticated or not judges, based on a maximum value of the matching score, whether the user is to be authenticated as being the registered user or not.

6. The biometric authentication apparatus according to claim 1, wherein for each of the first and second representative matching data, the storage device stores a registered environmental parameter representing the environment at the time of the generation of the biometric image used for the computation of the representative matching data,
the matching the input matching data against at least one of the first and second representative matching data matches the input matching data against one of the first and second representative matching data that corresponds to the registered environmental parameter closest in value to the environmental parameter representing the environment at the time of the generation of the biometric image, and computes a matching score indicating the degree of similarity between the representative matching data and the input matching data, and
the judging whether the user is to be authenticated as being the registered user or not judges, based on the matching score, whether the user is to be authenticated as being the registered user or not.

7. A biometric authentication method comprising:
generating, by a biometric sensor, a biometric image that represents biometric information of a user;
generating, by a processor, from the biometric image, input matching data for the user;
matching, by the processor, the input matching data against at least one of first and second representative matching data, the first representative matching data being generated based on the input matching data obtained during a period when the degree of similarity between the input matching data and first matching data for a registered user is equal to or larger than a threshold value, and the second representative matching data being generated based on the input matching data obtained during a period when the degree of similarity between the input matching data and the first matching data is larger than the degree of similarity between the input matching data and the first representative matching data; and judging, by the processor, based on a result of the matching, whether the user is to be authenticated as being the registered user or not.

8. The biometric authentication method according to claim 7, wherein the matching the input matching data against at least one of the first and second representative matching data computes a first matching score that indicates the degree of similarity between the first matching data and the input matching data, and wherein the biometric authentication method further comprises obtaining, by the processor, a minimum value of the first matching score by examining temporal variation of the first matching score computed each time the user is authenticated as being the registered user, and taking, by the processor, the input matching data corresponding to the minimum value as the first representative matching data.

9. The biometric authentication method according to claim 8, wherein a storage device stores the first matching data and stores second matching data which is updated by the input matching data, and wherein the biometric authentication method further comprises:

when the first matching score computed for the input matching data obtained from the most recent biometric image is smaller than the minimum value of the first matching score computed previously, replacing the second matching data by the input matching data, and when the first matching score is larger than a second matching score that indicates the degree of similarity between the input matching data obtained from the most recent biometric image and the second matching data, taking the second matching data as the second representative matching data.

10. The biometric authentication method according to claim 7, further comprising:

each time the input matching data is computed, acquiring, by an environmental information acquiring device, an environmental parameter representing the environment at the time of the generation of the input matching data; and taking, as the first or second representative matching data, the input matching data obtained from the biometric image corresponding to a minimum value or a maximum value of the environmental parameter.

11. The biometric authentication method according to claim 7, wherein for each of the first and second representative matching data of the at least two different portions, the matching the input matching data against at least one of the first and second representative matching data computes a matching score indicating the degree of similarity between the input matching data and the representative matching data, and the judging whether the user is to be authenticated or not judges, based on a maximum value of the matching score, whether the user is to be authenticated as being the registered user or not.

12. The biometric authentication method according to claim 7, wherein for each of the first and second representative matching data, a storage device stores a registered environmental parameter representing the environment at the time of the generation of the biometric image used for the computation of the representative matching data, the matching the input matching data against at least one of the first and second representative matching data matches the input matching data against one of the first and second representative matching data that corresponds to the registered environmental parameter closest in value to the environmental parameter representing the environment at the time of the generation of the biometric image, and computes a matching score indicating the degree of similarity between the representative matching data and the input matching data, and the judging whether the user is to be authenticated or not judges, based on the matching score, whether the user is to be authenticated as being the registered user or not.

13. A non-transitory computer-readable recording medium having recorded thereon a biometric authentication computer program that causes a computer to execute a process comprising:

generating, from a biometric image representing biometric information of a user, input matching data for the user;

matching the input matching data against at least one of first and second representative matching data, the first representative matching data being generated based on the input matching data obtained during a period when the degree of similarity between the input matching data and first matching data for a registered user is equal to or larger than a threshold value, and the second representative matching data being generated based on the input matching data obtained during a period when the degree of similarity between the input matching data and the first matching data is larger than the degree of similarity between the input matching data and the first representative matching data; and judging, based on a result of the matching, whether the user is to be authenticated as being the registered user or not.

* * * * *